(12) United States Patent
Tagesson et al.

(10) Patent No.: US 11,938,909 B2
(45) Date of Patent: Mar. 26, 2024

(54) OPERATING A VEHICLE COMPRISING VEHICLE RETARDING SUBSYSTEM

(71) Applicant: Volvo Truck Corporation, Gothenburg (SE)

(72) Inventors: Kristoffer Tagesson, Gothenburg (SE); Leon Henderson, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 467 days.

(21) Appl. No.: 17/276,196

(22) PCT Filed: Sep. 13, 2018

(86) PCT No.: PCT/EP2018/074766
§ 371 (c)(1),
(2) Date: Mar. 15, 2021

(87) PCT Pub. No.: WO2020/052764
PCT Pub. Date: Mar. 19, 2020

(65) Prior Publication Data
US 2022/0024432 A1    Jan. 27, 2022

(51) Int. Cl.
*B60T 13/58*        (2006.01)
*B60L 3/00*         (2019.01)
(Continued)

(52) U.S. Cl.
CPC .......... *B60T 13/586* (2013.01); *B60L 3/0076* (2013.01); *B60L 15/2018* (2013.01);
(Continued)

(58) Field of Classification Search
CPC .. B60T 13/586; B60L 3/0076; B60L 15/2018; B60L 2200/36; B60L 2240/642; B60W 10/08; B60W 30/18127
(Continued)

(56) References Cited

U.S. PATENT DOCUMENTS

2004/0032264 A1* 2/2004 Schoch ................ G01R 31/379
324/426
2004/0173396 A1   9/2004 Rush et al.
(Continued)

FOREIGN PATENT DOCUMENTS

CN          1413854 A     4/2003
CN        101643034 A     2/2010
(Continued)

OTHER PUBLICATIONS

English translation of JP2015181338A, Accessed Aug. 2023 (Year: 2023).*
(Continued)

*Primary Examiner* — Krishnan Ramesh
(74) *Attorney, Agent, or Firm* — Withrow & Terranova, PLLC

(57) ABSTRACT

A method of operating a vehicle comprising at least a first vehicle retarding subsystem controllable to retard the vehicle, and processing circuitry coupled to the at least first vehicle retarding subsystem, the method comprising the steps of: acquiring, by the processing circuitry from the first vehicle retarding subsystem, at least one value indicative of current energy accumulation by the first vehicle retarding subsystem; and determining, by the processing circuitry, a measure indicative of a retardation energy capacity currently available for retardation of the vehicle, based on: the acquired at least one value indicative of current energy accumulation by the first vehicle retarding subsystem; a predefined model of retardation energy accumulation by the first vehicle retarding subsystem; and a predefined limit indicative of a maximum allowed energy accumulation by the first vehicle retarding subsystem.

11 Claims, 4 Drawing Sheets

(51) Int. Cl.
*B60L 15/20* (2006.01)
*B60W 10/08* (2006.01)
*B60W 30/18* (2012.01)

(52) U.S. Cl.
CPC ...... *B60W 10/08* (2013.01); *B60W 30/18127* (2013.01); *B60L 2200/36* (2013.01); *B60L 2240/642* (2013.01)

(58) Field of Classification Search
USPC .......................................................... 701/70
See application file for complete search history.

(56) References Cited

U.S. PATENT DOCUMENTS

| | | | |
|---|---|---|---|
| 2005/0062449 A1 | 3/2005 | Wang et al. | |
| 2005/0137060 A1 | 6/2005 | Kuras et al. | |
| 2006/0069488 A1 | 3/2006 | Sychra et al. | |
| 2006/0086547 A1 | 4/2006 | Shimada et al. | |
| 2010/0305821 A1* | 12/2010 | Huseman | B60L 58/15 |
| | | | 701/54 |
| 2012/0330523 A1 | 12/2012 | Jensen | |
| 2013/0204443 A1* | 8/2013 | Steven | G05B 13/04 |
| | | | 700/286 |
| 2014/0149010 A1* | 5/2014 | Li | B60L 15/2045 |
| | | | 701/70 |
| 2014/0304025 A1* | 10/2014 | Steven | G06Q 10/06314 |
| | | | 705/7.24 |
| 2015/0202965 A1* | 7/2015 | Gabor | B60L 7/18 |
| | | | 701/70 |
| 2016/0138665 A1* | 5/2016 | Antanaitis | B60T 17/22 |
| | | | 701/70 |
| 2016/0236688 A1 | 8/2016 | Mei et al. | |
| 2017/0074130 A1* | 3/2017 | Leone | F01M 5/001 |
| 2017/0240167 A1 | 8/2017 | Lu et al. | |
| 2018/0141528 A1 | 5/2018 | Oh et al. | |
| 2018/0257473 A1* | 9/2018 | Follen | B60W 20/12 |
| 2019/0017561 A1* | 1/2019 | Antanaitis | B60T 17/221 |
| 2019/0077500 A1* | 3/2019 | Kipp | B60T 8/171 |
| 2019/0107163 A1* | 4/2019 | Medinei | F16D 66/026 |
| 2019/0331033 A1* | 10/2019 | Sharp | F02D 41/021 |
| 2020/0094801 A1* | 3/2020 | Huff | B60T 8/172 |
| 2020/0339083 A1* | 10/2020 | Bill | B60T 17/22 |

FOREIGN PATENT DOCUMENTS

| | | | | |
|---|---|---|---|---|
| CN | 103507798 A | | 1/2014 | |
| CN | 107757592 A | | 3/2018 | |
| CN | 108146422 A | | 6/2018 | |
| EP | 3849864 A1 | | 7/2021 | |
| JP | 2008087500 A | | 4/2008 | |
| JP | 2015518451 A | | 7/2015 | |
| JP | 2015181338 A | * | 10/2015 | ............. B60K 17/34 |
| JP | 201785723 A | | 5/2017 | |
| KR | 101541711 B1 | | 8/2015 | |
| WO | 2013095242 A1 | | 6/2013 | |
| WO | 2013167149 A1 | | 11/2013 | |
| WO | 2014/161557 A1 | | 10/2014 | |
| WO | 2016066481 A1 | | 5/2016 | |

OTHER PUBLICATIONS

Reasons for Rejection for Japanese Patent Application No. 2021510323, dated Oct. 25, 2022, 6 pages.
International Search Report and Written Opinion for PCT/EP2018/074766, dated Jul. 15, 2019, 13 pages.
First Office Action for Chinese Patent Application No. 201880097466.4, dated Aug. 25, 2023, 14 pages.
Notice of Opposition for European Patent Application No. 18779236.1, dated Sep. 6, 2023, 61 pages.

* cited by examiner

OPERATING A VEHICLE COMPRISING VEHICLE RETARDING SUBSYSTEM

This application is a 35 USC 371 national phase filing of International Application No. PCT/EP2018/074766, filed Sep. 13, 2018, the disclosure of which is incorporated herein by reference in its entirety.

TECHNICAL FIELD

The invention relates to a method of operating a vehicle comprising at least one vehicle retarding subsystem, a vehicle control unit, and a vehicle.

The invention can be applied in heavy-duty vehicles, such as trucks, buses and construction equipment. Although the invention will be described with respect to a truck, the invention is not restricted to this particular vehicle, but may also be used in other vehicles such as a bus, or working machines, such as wheel loaders or excavators etc. In particular, the vehicle may include a trailer, and at least one vehicle retardation subsystem may be comprised in the trailer.

BACKGROUND

When a vehicle is operated in hilly areas, whether autonomously or by a human driver, it is important to select a speed that is appropriate for the situation to avoid overheating brakes (also known as fading brakes).

The challenge of selecting an appropriate downhill speed is however not trivial on a heavy vehicle, such as a truck, as there may be several fundamentally vehicle retarding subsystems available that can be combined to realize brake action.

US2006/0069488 discloses a method for dissipating power in a propelled machine having an electric drive system and a mechanical brake system. An inclination of the machine is determined. A speed of the machine is determined. A retarding requirement is determined based on the determined inclination and speed. A first portion of the retarding requirement is allocated to be met by the electric drive system, the first portion being less than or equal to a retarding capacity of the electric drive system. A second portion of the retarding requirement is allocated to be met by the mechanical brake system if the retarding requirement is greater than the retarding capacity of the electric drive system.

It would, however, be desirable to provide for improved control of a vehicle comprising at least one vehicle retarding subsystem.

SUMMARY

An object of the invention is thus to provide for improved control of a vehicle comprising at least one vehicle retarding subsystem.

According to a first aspect of the present invention, this object is achieved by a method of operating a vehicle comprising at least a first vehicle retarding subsystem controllable to retard the vehicle, and processing circuitry coupled to the at least first vehicle retarding subsystem, the method comprising the steps of: acquiring, by the processing circuitry from the first vehicle retarding subsystem, at least one value indicative of current energy accumulation by the first vehicle retarding subsystem; and determining, by the processing circuitry, a measure indicative of a retardation energy capacity currently available for retardation of the vehicle, based on: the acquired at least one value indicative of current energy accumulation by the first vehicle retarding subsystem; a predefined model of retardation energy accumulation by the first vehicle retarding subsystem; and a predefined limit indicative of a maximum allowed energy accumulation by the first vehicle retarding subsystem.

The above-mentioned at least one value indicative of current energy accumulation by said first vehicle retarding subsystem may be at least one value of a property that is dependent on the type of vehicle retarding subsystem.

For a friction brake subsystem, the energy accumulation may for example be indicated by one or several of a brake component temperature, a scalar percentage number that is indicative of how close the service brakes are from being overheated, a remaining braking time capacity with current settings, etc. For an electric propulsion system in retardation mode, the energy accumulation may for example be indicated by one or several of a state of charge of the battery, and a temperature of the electric motor, etc. For an internal combustion engine (ICE) in retardation mode, the energy accumulation may for example be indicated by one or several of a temperature, and engine speed, etc.

The above-mentioned predefined model of retardation energy accumulation by the at least first vehicle retarding subsystem may be an analytical or empirical model of the particular vehicle retarding subsystem.

For a friction brake subsystem, the model may, for instance, provide a connection between temperature increase and energy accumulation in the components of the friction brake subsystem. For an electric propulsion system in retardation mode, the model may, for instance, take into account the remaining charge that can be accepted by the battery without damage to the battery, as well as the possible charging rate. For an ICE in retardation mode, the model may, for instance, provide a connection between temperature increase and energy accumulation in the ICE.

The above-mentioned predefined limit may be selected to avoid damage and/or loss of retardation capacity by the vehicle retarding subsystem(s). The limit may be determined based on, for instance, simulation and/or testing.

The present invention is based on the realization that the retardation energy capacity currently available for retardation of the vehicle would be a very useful property for communicating the capabilities of the retarding subsystem(s) of the vehicle, to provide for safe operation of the vehicle, in particular in hilly areas. For example, information about the retardation energy capacity currently available for retardation of the vehicle may facilitate implementation of an autonomous driving application for the vehicle. In particular, minimum or no adaptation of the autonomous driving application may be required for different vehicles with different sets of vehicle retarding subsystems, which may reduce the time for development of autonomous vehicles. In the context of the present application, the retardation energy capacity currently available for retardation of the vehicle may sometimes be referred to as Vehicle Combination Retardation Energy Capacity (VCREC).

According to embodiments, the method may further comprise the step of determining a measure indicative of a sustainable retardation power provided by the vehicle without accumulation of retardation energy by the at least first vehicle retarding subsystem.

Some motion actuators constantly dissipate energy. Heat dissipation from brake pads is one example. Moreover, the vehicle is affected by external forces, e.g. air-drag and rolling resistance. These two classes of sustainable energy dissipation can be represented by a sustainable retardation power provided by the vehicle without accumulation of retardation energy. In the context of the present application, this power may sometimes be referred to as Vehicle Combination Retardation Threshold Power (VCRTP).

Access to the above-mentioned measure indicative of the sustainable retardation power, in addition to the retardation energy capacity currently available for retardation of the vehicle may provide for more precise control of the vehicle, potentially allowing for faster travel of the vehicle, while still ensuring safe operation in hilly areas.

According to embodiments, the vehicle may further comprise a second vehicle retarding subsystem controllable to retard the vehicle, and the processing circuitry may further be coupled to the second vehicle retarding subsystem; the method may further comprise the step of acquiring, by the processing circuitry from the second vehicle retarding subsystem, at least one value indicative of current energy accumulation by the second vehicle retarding subsystem; and the measure indicative of the retardation energy capacity currently available for retardation of the vehicle may be further determined based on: the acquired at least one value indicative of current energy accumulation by the second vehicle retarding subsystem; a predefined model of retardation energy accumulation by the second vehicle retarding subsystem; and a predefined limit indicative of a maximum allowed energy accumulation by the second vehicle retarding subsystem.

The first and second vehicle retarding subsystems may, for example, be different types of vehicle retarding subsystems, such as different ones of a friction brake subsystem, an electric propulsion system in retardation mode, and an internal combustion engine (ICE) in retardation mode, etc.

According to embodiments, the method may further comprise the step of: providing, by the processing circuitry, a signal indicative of the retardation energy capacity currently available for retardation of the vehicle. The signal may, for example, be provided to an autonomous driving application for the vehicle, or to a driver support module. The signal may, for instance, be used for determining a currently allowed maximum speed of the vehicle.

According to various embodiments, the vehicle may further comprise a routing subsystem for estimating a future vehicle route including at least elevation information, the routing subsystem being coupled to the processing circuitry; and the method may further comprise the steps of: acquiring, by the processing circuitry from the routing subsystem, a signal indicative of elevation information of the future vehicle route; and determining a maximum allowed speed of the vehicle based on: the measure indicative of the retardation energy capacity currently available for retardation of the vehicle; the signal indicative of the elevation information of the future vehicle route; and a mass of the vehicle. The above-mentioned maximum allowed speed may be a maximum currently allowed speed, which may vary over time depending on, for example, the topography of the route ahead. The processing circuitry may, for example, determine a time-varying or constant predicted maximum allowed speed for a road segment ahead.

Advantageously, the method may further comprise the step of acquiring at least one ambient condition parameter value; and the maximum allowed speed of the vehicle may be determined additionally based on the at least one ambient condition parameter value. Examples of ambient condition parameter values may include an ambient temperature, a wind speed, a wind direction, an estimated road friction, etc.

Furthermore, the method may further comprise the step of determining a measure indicative of a sustainable retardation power provided by the vehicle without accumulation of retardation energy by the at least first vehicle retarding subsystem; and the maximum allowed speed of the vehicle may be determined additionally based on the measure indicative of the sustainable retardation power.

In embodiments, the method may further comprise the step of providing a signal indicative of the maximum allowed speed of the vehicle. The signal may, for example, be provided to an autonomous driving application for the vehicle, or to a driver support module. Operation of the vehicle, such as operation of the prime mover (an ICE and/or an electric propulsion system) and/or the at least one vehicle retarding subsystem may be controlled based on this signal.

According to embodiments, the method may further comprise the step of controlling the vehicle to travel with a speed below the maximum allowed speed.

In embodiments, the at least first vehicle retarding subsystem may include at least one of a friction brake subsystem, an internal combustion engine, a retarder, and an electric propulsion system.

According to a second aspect of the present invention, the above-mentioned object is achieved by a vehicle control unit defined by claim 11.

In embodiments, the vehicle control unit may further comprise a communication interface, for providing a signal indicative of the retardation energy capacity currently available for retardation of the vehicle.

According to a third aspect of the present invention, the above-mentioned object is achieved by a computer program defined by claim 13.

Moreover, the vehicle control unit according to embodiments of the present invention may be included in a vehicle, further comprising at least a first vehicle retarding subsystem controllable to retard the vehicle.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
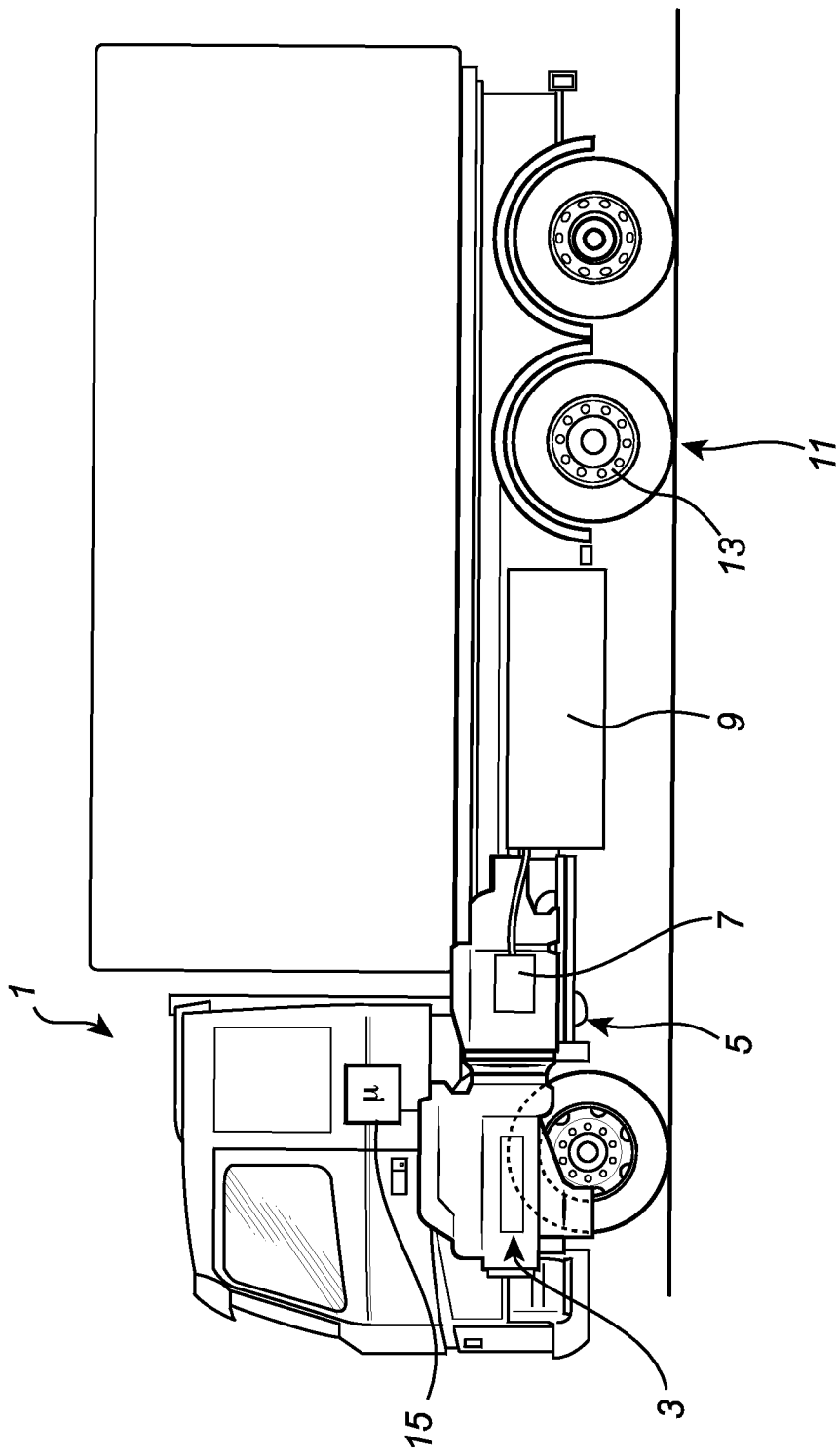
FIG. 1 is a side view of a vehicle according to an embodiment of the present invention, in the form of a truck including at least a first vehicle retarding subsystem.

FIG. 1 schematically shows a vehicle according to an example embodiment of the present invention, here in the form of a truck 1, including an ICE arrangement 3, an electric propulsion system 5, wheels 11, a friction brake subsystem 13, and a vehicle control unit 15 for controlling operation of the vehicle 1. The electric propulsion system 5 comprises an electric motor 7 and a battery module 9.

The vehicle 1 in FIG. 1 includes three different vehicle retarding subsystems: the friction brake subsystem 13, the ICE arrangement 3, when in retardation mode, and the electric propulsion system 5, when in retardation mode. It should be understood that the vehicle 1 may comprise additional vehicle retardation subsystems, for instance a mechanical energy storage device, such as a fly wheel, and/or a hydraulic energy storage device, such as a hydraulic accumulator.

Figure 2:
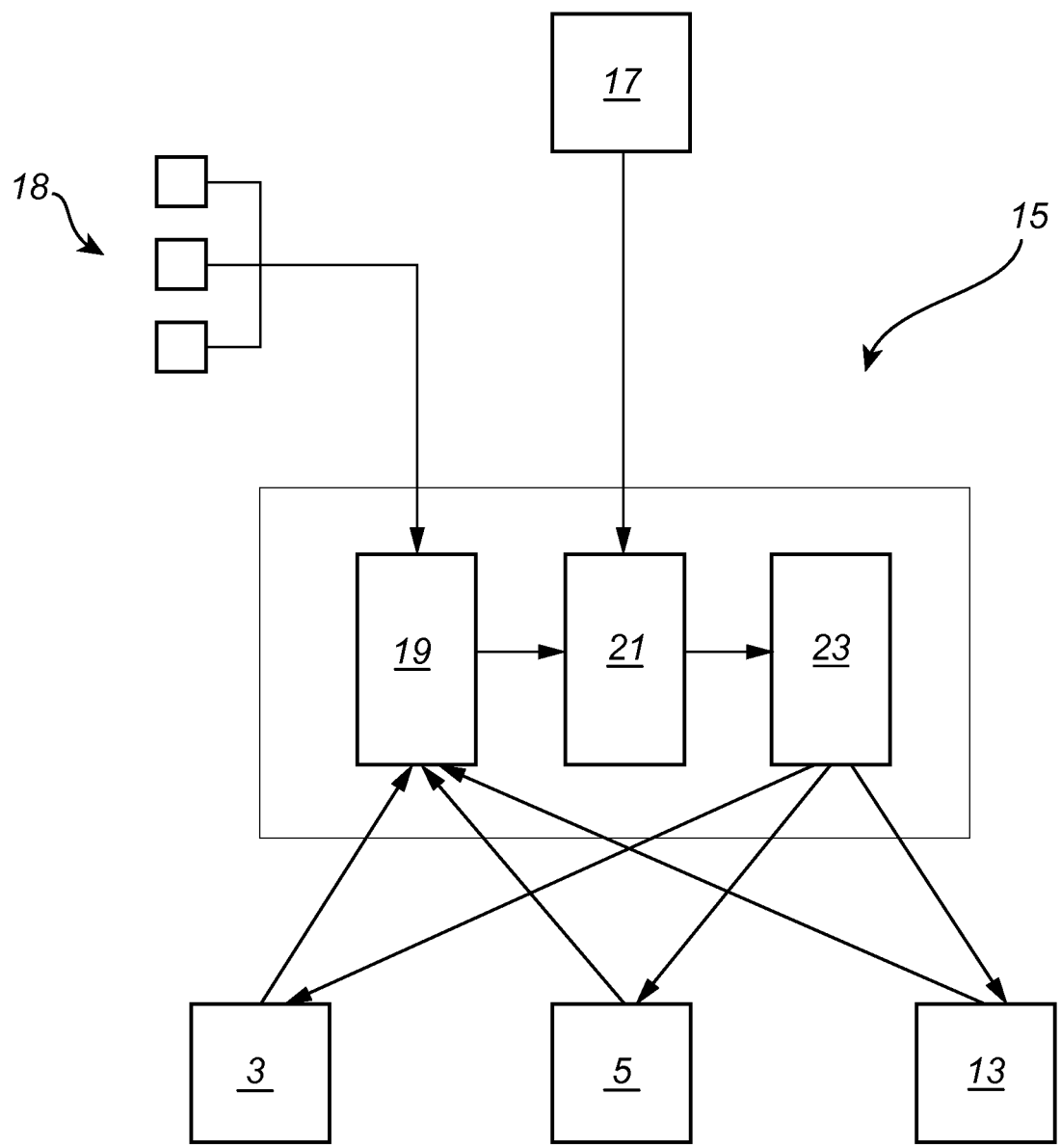
FIG. 2 is a simplified schematic block diagram of the vehicle in FIG. 1.

FIG. 2 is a simplified schematic block diagram of the vehicle in FIG. 1. Referring to FIG. 2, the vehicle control unit comprises a retardation capacity determining block 19, a motion planning block 21, and a vehicle control block 23. As is schematically indicated in FIG. 2, the retardation capacity determining block 19 is coupled to the ICE 3, the electric propulsion system 5, the friction brake subsystem 13, and vehicle sensors collectively indicated by reference numeral 18. Such vehicle sensors 18 may, for example, include sensors for measuring ambient temperature and/or wind speed and/or road surface friction. The motion planning block 21 is coupled to a routing subsystem 17, and the vehicle control block 23 is coupled to the ICE arrangement 3, the electric propulsion system 5, and the friction brake subsystem 13.

The interfaces between the different blocks of the vehicle control unit 15 may, for example, be software interfaces (so-called APIs) or hardware interfaces (e.g. an Ethernet bus or a CAN bus). In other words, the interfaces could either be parts of the interface between ECUs or it can be interfaces between software components.

Figure 3:
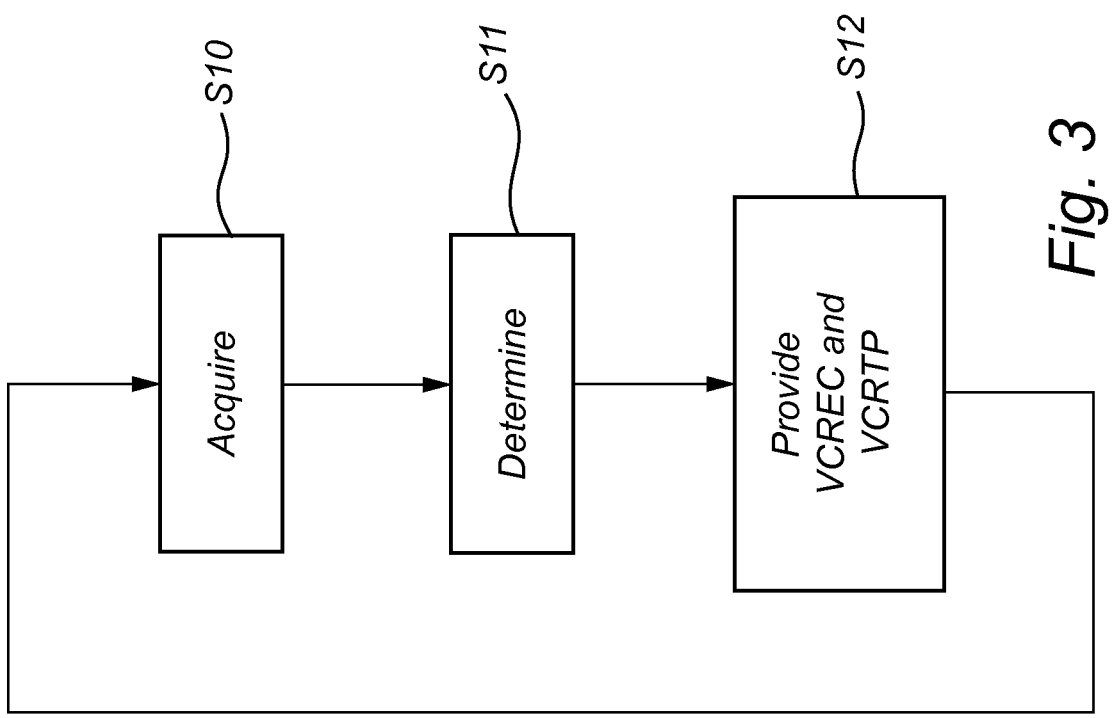
FIG. 3 is a flow-chart schematically illustrating a method according to a first example embodiment of the present invention.

A first example embodiment of the method according to the present invention will now be described with reference to the flow-chart in FIG. 3, and with continued reference to FIG. 1 and FIG. 2 as indicated.

In a first step S10, the retardation capacity determining block 19 acquires at least one value indicative of current energy accumulation by each of the vehicle retarding subsystems of the vehicle 1. In the example embodiment outlined in FIG. 1 and FIG. 2, the retardation capacity determining block 19 thus acquires such values from each of the ICE arrangement 3, the electric propulsion system 5, and the friction brake subsystem 13. For instance, the retardation capacity determining block 19 may acquire one or several temperature readings from the ICE arrangement 3, the state of charge of the batteries 9 from the electric propulsion system 5, and one or several temperature readings from the friction brake subsystem 13. In addition, the retardation capacity determining block 19 may acquire at least one ambient condition parameter value from the vehicle sensor (s) 18.

Based on the acquired parameter values, the retardation capacity determining block 19 determines, in step S11, a measure indicative of the retardation energy capacity currently available for retardation of the vehicle (VCREC), and a measure indicative of a sustainable retardation power provided by the vehicle 1 without accumulation of retardation energy by the vehicle retarding subsystems (VCRTP).

The determination of VCREC is further based on predefined models of retardation accumulation by the respective vehicle retarding subsystems, and predefined limits indicative of a maximum allowed energy accumulation by the respective vehicle retarding subsystems.

For instance, VCREC may be calculated as the sum of:

Maximum brake heat energy that can be absorbed by friction brakes before they start to overheat (i.e. fundamentally lower braking capability or get damaged).

Maximum brake heat energy that can be absorbed by all prime movers (e.g. internal combustion engine or electric motors) before there is a risk of damage/fundamentally worsened performance.

Maximum brake electric energy that can be stored in battery packs or other electrical energy storage devices.

Maximum brake mechanical energy that can be stored in a mechanical energy storage device, such as a fly wheel before there is a risk of either damage or fundamentally worsened performance.

Maximum brake hydraulic energy that can be stored in hydraulic energy storage devices (such as a hydraulic accumulator).

For instance, VCRTP can be derived as a function of speed. For a certain speed it can be calculated as the sum of:

Braking power owing to air-drag on the vehicle combination, calculated at said speed.

Braking power owing to rolling resistance of the vehicle, calculated at said speed.

Heat dissipation power from all friction brakes, calculated at said speed.

Heat dissipation power from all prime movers used also for braking, calculated at said speed.

It should be noted that, for instance air-drag and rolling resistance do not need to be part of the calculation of VCRTP, and that such factors may be taken into account as separate terms.

In the next step S12, the retardation capacity determining block 19 provides a signal indicative of VCREC and VCRTP. In embodiments, this signal may be provided to the motion planning block 21 of the vehicle control unit 15. After step S12, the method may return to step S10.

Figure 4:
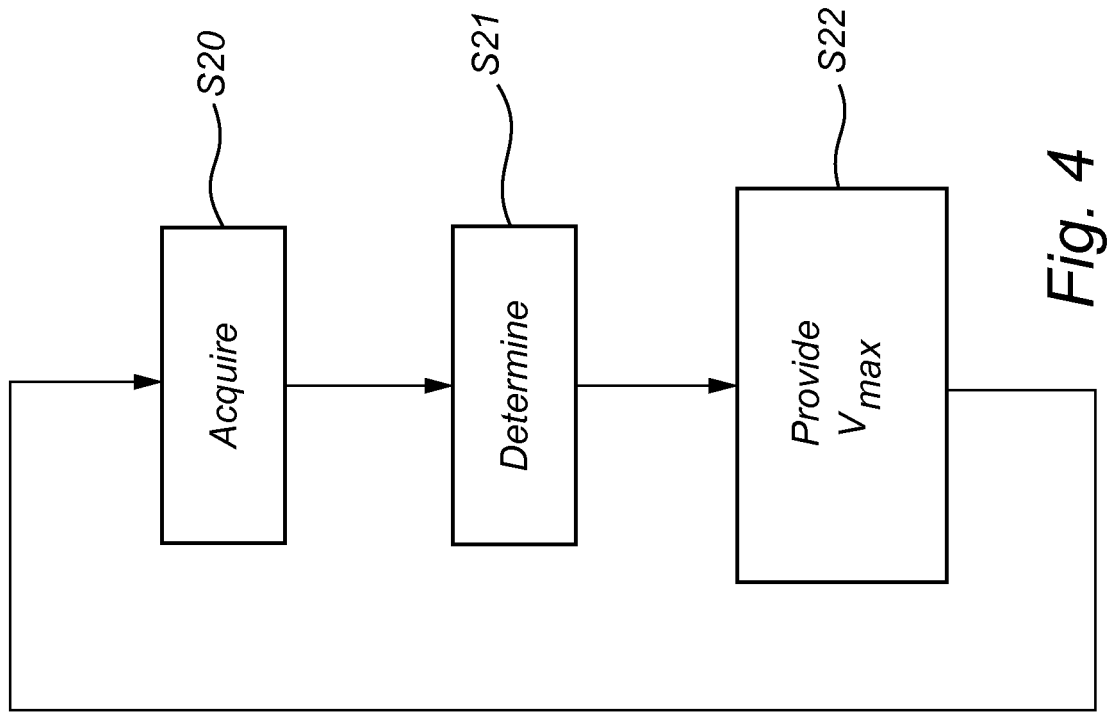
FIG. 4 is a flow-chart schematically illustrating a method according to a second example embodiment of the present invention.

A second example embodiment of the method according to the present invention will now be described with reference to the flow-chart in FIG. 4, and with continued reference to FIG. 1 and FIG. 2 as indicated.

In a first step S20, at least one value indicative of current energy accumulation by each of the vehicle retarding subsystems of the vehicle 1, and at least one ambient condition parameter value from the vehicle sensor(s) 18 are acquired as described above for step S10 of the flow-chart in FIG. 3. In addition, a signal indicative of elevation information of a future vehicle route is acquired from the routing subsystem 17, by the motion planning block 21 of the vehicle control unit 15 in FIG. 2.

In the next step S21, VCREC and VCRTP are determined as described above for step S11 of the flow-chart in FIG. 3. In addition, the maximum allowed vehicle speed $v_{max}$ is determined, for example by the motion planning block 21 in FIG. 2.

According to one example implementation, it may be verified that a speed profile is considered as safe based on the following relation:

$$\int_0^{s_{end}} \left( m*a_x + m*g*\sin(\delta_{slope}) - \frac{VCRTP}{v_x} \right) *ds < VCREC,$$

where m is the vehicle combination weight, $a_x$ is desired longitudinal deceleration level, g is the gravitational constant, $\delta_{slope}$ is road slope angle (positive uphill), $v_x$ is the desired longitudinal velocity, the integration variable s is travelled distance, and $s_{end}$ is an arbitrary distance parameter. The relation may advantageously be verified for several different values of $s_{end}$. One important candidate may be to set $s_{end}$ equal to the length of an upcoming slope. The verified safe speed profile $v_x(s)$ will then define the maximum allowed speed at different points along the route ahead of the vehicle 1.

According to another example implementation, it may be verified that a speed profile is considered as safe based on the following relation:

$$\int_0^{s_{end}} \left( m*a_x + m*g*\sin(\delta_{slope}) - F_a - F_r - \frac{VCRTP}{v_x} \right) * ds < VCREC,$$

where $F_a$ denotes air-drag force and $F_r$ denotes rolling resistance force. In this example, VCRTP has been determined without taking air-drag and rolling resistance into account.

In the subsequent step S22, a signal indicative of the verified safe speed profile is provided by the motion planning block 21. In embodiments, this signal may be provided to the vehicle control block 23 of the vehicle control unit 15. After step S22, the method may return to step S20.

Figure 5:
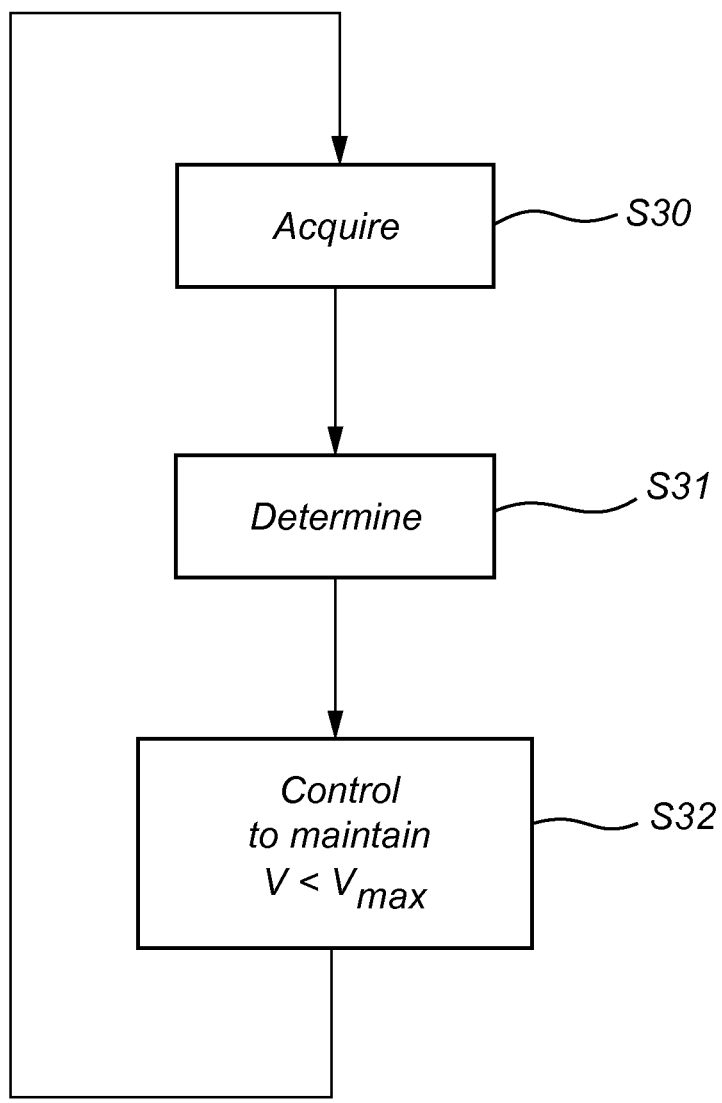
FIG. 5 is a flow-chart schematically illustrating a method according to a third example embodiment of the present invention.

A third example embodiment of the method according to the present invention will now be described with reference to the flow-chart in FIG. 5, and with continued reference to FIG. 1 and FIG. 2 as indicated.

In a first step S30, values are acquired as described above for step S20 of the flow-chart in FIG. 4.

In the next step S31, a verified safe speed profile $v_x(s)$ defining the maximum allowed speed at different points along the route ahead of the vehicle 1 is determined as described above for step S21 of the flow-chart in FIG. 4.

In the subsequent step S32, the various vehicle subsystems, such as the ICE arrangement 3, the electric propulsion system 5, and the friction brake subsystem 13 are controlled by the vehicle control block 23 of the vehicle control unit 15 to achieve the verified safe speed profile determined in step S31.

It is to be understood that the present invention is not limited to the embodiments described above and illustrated in the drawings; rather, the skilled person will recognize that many changes and modifications may be made within the scope of the appended claims.

The invention claimed is:

1. A method of operating a vehicle, comprising:
acquiring, by processing circuitry from a first vehicle retarding subsystem, at least one value indicative of current energy accumulation by the first vehicle retarding subsystem;
determining, by the processing circuitry, a measure indicative of a retardation energy capacity currently available for retardation of the vehicle, based on:
the acquired at least one value indicative of current energy accumulation by the first vehicle retarding subsystem;
a predefined model of retardation energy accumulation by the first vehicle retarding subsystem; and
a predefined limit indicative of a maximum allowed energy accumulation by the first vehicle retarding subsystem; and
determining a measure indicative of a sustainable retardation power provided by the vehicle without accumulation of retardation energy by the at least first vehicle retarding subsystem.

2. The method of claim 1, further comprising:
acquiring, by the processing circuitry from a second vehicle retarding subsystem, at least one value indicative of current energy accumulation by the second vehicle retarding subsystem; and
the measure indicative of the retardation energy capacity currently available for retardation of the vehicle is further determined based on:
the acquired at least one value indicative of current energy accumulation by the second vehicle retarding subsystem;
a predefined model of retardation energy accumulation by the second vehicle retarding subsystem; and
a predefined limit indicative of a maximum allowed energy accumulation by the second vehicle retarding subsystem.

3. The method of claim 1, further comprising providing, by the processing circuitry, a signal indicative of the retardation energy capacity currently available for retardation of the vehicle.

4. The method of claim 1, further comprising:
acquiring, by the processing circuitry from a routing subsystem, a signal indicative of elevation information of the future vehicle route; and
determining a maximum allowed speed of the vehicle based on:
the measure indicative of the retardation energy capacity currently available for retardation of the vehicle;
the signal indicative of the elevation information of the future vehicle route; and
a mass of the vehicle.

5. The method of claim 4,
further comprising acquiring at least one ambient condition parameter value;
wherein the maximum allowed speed of the vehicle is determined additionally based on the at least one ambient condition parameter value.

6. The method of claim 4,
further comprising determining a measure indicative of a sustainable retardation power provided by the vehicle without accumulation of retardation energy by the at least first vehicle retarding subsystem; and
wherein the maximum allowed speed of the vehicle is determined additionally based on the measure indicative of the sustainable retardation power.

7. The method of claim 4, further comprising providing a signal indicative of the maximum allowed speed of the vehicle.

8. The method of claim 4, further comprising controlling the vehicle to travel with a speed below the maximum allowed speed.

9. The method of claim 1, wherein the at least first vehicle retarding subsystem includes at least one of a friction brake subsystem, an internal combustion engine, a retarder, and an electric propulsion system.

10. A vehicle control unit, for controlling operation of a vehicle comprising at least a first vehicle retarding subsystem controllable to retard the vehicle, the vehicle control unit being configured to:
acquire, from the first vehicle retarding subsystem, at least one value indicative of current energy accumulation by the first vehicle retarding subsystem;
determine a measure indicative of a retardation energy capacity currently available for retardation of the vehicle, based on:
the acquired at least one value indicative of current energy accumulation by the first vehicle retarding subsystem;
a predefined model of retardation energy accumulation by the first vehicle retarding subsystem; and a predefined limit indicative of a maximum allowed energy accumulation by the first vehicle retarding subsystem; and determine a measure indicative of a sustainable retardation power provided by the vehicle without accumulation of retardation energy by the at least first vehicle retarding subsystem.

11. The vehicle control unit of claim 10, further comprising a communication interface for providing a signal indicative of the retardation energy capacity currently available for retardation of the vehicle.

* * * * *